Patented Apr. 21, 1953

2,636,042

UNITED STATES PATENT OFFICE 2,636,042

WATER-SOLUBLE HORMONE COMPOUNDS

Ralph Salkin, Jackson Heights, N. Y., assignor to S. B. Penick and Company, New York, N. Y., a corporation of Delaware No Drawing. Application July 8, 1949,
Serial No. 103,759

5 Claims. (Cl. 260—397.4)

My invention relates to an improvement in the manufacture of water-soluble compounds of the estrane series, and in particular it is concerned with an improvement in the synthesis of alkali and alkaline-earth metal salts of the sulfates of the estranes.

The estranes to which my invention applies are steroids having a free hydroxyl group in the 3-position and a hydroxy or keto group in the 17-position of the molecule, such as estrone, equilin, equilenin, estradiol and similar compounds.

These products which are commonly known as conjugated estrogens can be obtained from natural sources such as the urine of pregnant mares or of stallions. The principal water-soluble compound which they contain is sodium estrone sulfate which, however, is difficult to isolate from the natural sources in pure crystalline form.

Attempts to synthesize the sulfuric acid ester of estrone and its salts have been commercially unsatisfactory in that the ester was obtained as a reddish brown oil (A. Butenandt and H. Hofstetter, Zeitschr. physiol. Chemie 259, 222 at 232, 1939). In that form the ester cannot conveniently be purified and be converted into its pure sodium salt in good yields and in a manner feasible for production.

It is therefore an object of my invention to find an improved method by which the ester can readily be obtained in a novel form which will lend itself with particular ease to purification and conversion into the salts. Other objects of my invention are this novel form of the ester, and the various new salts which can be obtained therefrom.

I have found that these various objects can be accomplished, if the pure hormones or, if desired, crude mixtures containing them are reacted with an excess of a pure tertiary amine-sulfur trioxide adduct in a suitable solvent mixture, for instance an inert chlorinated hydrocarbon and pyridine, under anhydrous conditions.

I have discovered that the reaction products thus obtained, instead of being oily, are practically colorless and granular and in that form lend themselves with particular ease to purification and conversion into the salts. They are presumably a mixture of unreacted adduct and tertiary amine salts of the sulfate esters of the estranes.

The granular products can be purified and converted into a salt by decomposing them with an alkali or alkali earth metal carbonate or bicarbonate. The liberated amine is extracted with ether, and the sulfate is then salted out of the aqueous solution by the addition of a caustic solution under cooling. The liberated hormone sulfate is extracted into a suitable solvent, for instance butanol, pyridine being preferred however. The hormone sulfate solution is exhaustively extracted with ether to remove the solvent. The resultant semicrystalline product is recrystallized from a dilute monohydric alcohol or water to give the pure sterol ester.

In order to get pure ester salts, I have found it essential that the tertiary amine-sulfur trioxide adduct be absolutely pure when being reacted with the hormones. Improved yields and more readily purifiable light colored granular products result, if the tertiary amine-sulfur trioxide adduct is separately prepared, as above described, for instance by addition of "Sulfan B" (which is stabilized $SO_3$), or chlorosulfonic acid to a solution of the tertiary amine in the inert chlorinated hydrocarbon solvent under cooling and filtering and washing the reaction product, and using the adduct thus prepared to effect the reaction as described in the attached examples. Traces of occluded acids and moisture in an adduct employed without previous isolation as above described seem to have an adverse effect on the reaction.

The alkali sulfate salts thus obtained are the basis for the preparation of the alkaline earth metal salts. The latter are prepared, for instance, by adding a concentrated solution of the alkaline earth acetate to a concentrated aqueous solution of the acidified alkali metal sterol ester salts. The crude alkaline earth metal salts may be further purified by crystallization from water.

With this improved procedure it is now possible for the first time in this art to manufacture water-soluble compounds of the estrane series conveniently in excellent yields and in a high state of purity.

The following examples illustrate my invention:

*Example I.—Estrone sulfate sodium salt*

Ten grams of estrone (m. p. 254–256°) are dissolved in 40 cc. of pyridine and diluted with 100 cc. of carbon tetrachloride and chilled in an ice bath. Forty grams of dry pyridine $SO_3$ are suspended in 200 cc. of chloroform and cooled in an ice bath. The chilled estrone solution is added dropwise over a period of twenty minutes in an apparatus protected from moisture. The ice bath is removed and the reaction mixture heated to boiling and refluxed for 15 minutes.

The hot solution is filtered and the filter cake washed with a fresh portion of carbon tetrachloride.

The granular reaction product is decomposed with 150 ml. of water and 35 gms. $NaHCO_3$. The aqueous solution containing the reaction product is chilled and to the chilled reaction product is added 20 ml. pyridine and 40 ml. 50% NaOH solution. The mixture is well agitated and allowed to settle. The aqueous phase is discarded, and the pyridine solution of the reaction product extracted four times with 100 ml. portions of ether. The semicrystalline reaction product is taken up in anhydrous ethyl alcohol, charcoaled and filtered. The colorless filtrate is adjusted to 90% alcohol concentration by the addition of water and concentrated to incipient crystallization and refrigerated. The snow-white crystals are filtered off and dried to constant weight in a desiccator over sulfuric acid. Yield 11.70 gms. Empirical formula $C_{18}H_{21}O_5SNa.1H_2O$.

|  | Found | Theory |
|---|---|---|
| Estrone by dinitrophenylhydrazone percent | 68.8 | 69.2 |
| $[\alpha]_D^{20}$ (0.4% $H_2O$) degrees | +104 | |
| $[\alpha]_D^{20}$ (95% EtOH) do | +119 | |
| $[\alpha]_D^{20}$ (abs. MeOH) do | +122 | |
| Moisture percent | 4.3 | 4.6 |
| Sulfur as ($SO_4$): by micro Pregl do | 8.1 | 8.2 |
| Kober (chromogens as estrogens) do | 71 | |
| Sulfated ash do | 18.3 | 18.2 |
| Melting point | after sintering at 200° C. melts with decomposition at about 225° C. | |

Bioassay of the above compound by oral administration to rats showed a potency of 490,000 international units per gram expressed as estrone.

*Example II.—Estrone sulfate potassium salt*

The procedure of Example I was followed but $KHCO_3$ was used to decompose the crude reaction product. 60% KOH solution was employed to salt out the final product. The compound was crystallized from dilute alcohol. It had the following constants. Empirical formula $C_{18}H_{21}O_5SK$:

|  | Found | Theory |
|---|---|---|
| Estrone by dinitrophenylhydrazone percent | 69.3 | 69.5 |
| $[\alpha]_D^{20}$(0.4%, 95% EtOH) degrees | +114 | |
| Sulfated ash percent | 22.7 | 22.4 |
| Moisture do | 0.2 | 0 |

*Example III.—Estrone sulfate calcium salt*

One gram of estrone sulfate sodium salt is dissolved in 50 cc. of water and the solution acidified to pH 4 with dilute acetic acid. A slight excess of a 25% solution of calcium acetate solution is added and the flocculent precipitate centrifuged off and washed with small portions of ice cold water. The washed calcium salt is dissolved in a minimum quantity of hot distilled water, filtered and allowed to crystallize.

The crystals are filtered off and dried to constant weight over sulfuric acid. Empirical formula $(C_{18}H_{21}O_5S)_2Ca.3H_2O$:

|  | Found | Theory |
|---|---|---|
| Estrone by dinitrophenylhydrazone percent | 68.5 | 68.1 |
| Moisture do | 7.1 | 6.8 |
| Sulfated ash do | 17.1 | 17.1 |
| Rotation $[\alpha]_D^{25}$ (Hydrate) 0.4% $H_2O$ degrees | +120 | |

*Example IV.—Estrone sulfate ammonium salt*

500 mgs. sodium salt obtained as described in Example I were dissolved in 25 cc. water. The solution was acidified with three drops of 2.5 N HCl and to it was added 15 cc. of a 50% ammonium acetate solution. The flocculent precipitate thus produced was redissolved in the reaction mixture by warming. Filtering and chilling gave micro-needles of the desired compound in a 85% yield.

Empirical formula $C_{18}H_{21}O_5SNH_4.2H_2O$:

|  | Theory | Found |
|---|---|---|
| Moisture content percent | 8.9 | 9.1 |
| Estrone by dinitrophenylhydrazone do | 66.9 | 67.5 |
| $[\alpha]_D^{25}$ (0.4% in $H_2O$) degrees | +134 | |
| Sulfated ash | None | |

*Example V.—Sodium salt of sulfuric acid ester of natural estrogens*

The following initial material was reacted under the conditions described in Example I supra: A semi-purified crystallizate of estrogenic substances, melting point 235° C., and total ketone content of 86.3% as determined by dinitro-phenylhydrazone, $[\alpha]_D^{20}+147°$, and a potency of 8,600,000 international estrone units per gram.

The reaction product thus obtained had the following constants:

|  | Found |
|---|---|
| Ketones by dinitrophenylhydrazone | 56.5% |
| $[\alpha]_D^{20}$ (0.4% 95% EtOH) | 105.3° |
| Solubility in $H_2O$ at pH 8 (2% soln.) | complete |

It will be understood that the constants of this type of material are widely variable and a function solely of the constituents of the estrogenic substance used.

*Example VI.—Equilenin sulfate sodium salt*

Equilenin was isolated thru the picrate from mother liquors of the production of estrogenic substance. Picrate M. P. 203–205° C., $[\alpha]_D^{20}+87°$ (95% EtOH) (0.4% solution). The picrate was hydrolyzed and the resultant ketone recrystallized from 95% ethanol. It showed 96.4% ketone when assayed by the dinitrophenylhydrazone technique. This material was converted to the sulfate ester sodium salt by the procedure outlined in Example I. The crude product was recrystallized from dilute ethanol and gave a white microcrystalline, hygroscopic solid instantly soluble in water.

Empirical formula $C_{18}H_{17}O_5SNa.1H_2O$. M. W. 386.4:

|  | Found | Theory |
|---|---|---|
|  | Percent | Percent |
| Ketone Content (by DNPH) | 69.2 | 69.9 |
| Moisture | 5.3 | 4.7 |
| Sulfated ash | 18.9 | 18.4 |

*Example VII.—Equilin sulfate sodium salt*

An impure equilin was isolated from estrogenic substance with the following constants: rotation in alcohol +245°; ketones by dinitrophenylhydrazone 98.8%. The material was sulfated by the standard procedure and recrystallized from ethermethanol. The product was a white crystalline hydroscopic solid instantly soluble in water.

Empirical formula $C_{18}H_{19}O_5SNa \cdot 1H_2O$. M. W. 388.4:

| | Found | Theory |
|---|---|---|
| Ketone Content (by DNPH) _____percent__ | 69.4 | 69.5 |
| Moisture _____do____ | 4.7 | 4.6 |
| Sulfated ash _____do____ | 18.5 | 18.3 |
| $[\alpha]_D^{25}$ (0.4% in Methanol (25° C)) ___degrees__ | 187.5 | |

The method described in Example I may also be applied to the preparation of sulfate esters of estradiol, such as Estradiol 3 sulfate
Estradiol 3,17,disulfate
Estradiol 17-sulfate.

Each of the above described compounds has a characteristic U. V. absorption curve.

The inert chlorinated hydrocarbon in which the reaction occurs may be carbon tetrachloride which I prefer, or it may be $CH_2Cl_2$, $C_2H_4Cl_2$, $CHCl_3$, tri- or tetra chlorethylene or tetra chlorethane, and the tertiary amine of the sulfur trioxide adduct may be pyridine as shown in Example I, or picoline, dimethylaniline, N-ethylmorpholine, trimethylamine and the like.

These new synthetic alkali and alkaline earth metal salts of compounds of the estrane series have various novel and outstanding characteristics which distinguish them clearly from the natural products. They are crystalline, and they are free from odor and taste. They are completely soluble in water and stable in aqueous solutions. They possess oral biological potency, and are easily standardized by U. V. spectral analysis. They are readily formulated into compounds suitable for oral administration and subcutaneous injection; they can be formulated into either tablets, elixirs, or similar types of pharmaceutical preparations in the usual manner. As vehicles for tablet manufacture such substances as magnesium phosphate, magnesium trisilicate and sodium bicarbonate are suitable excepients. It is preferred in all formulations to keep the vehicles neutral to slightly alkaline to avoid any possible decomposition of the salts. These properties make the sgynthetic salts a definite improvement over the natural products and more useful in the treatment of menopausal symptoms, as they can be given orally without discomfort. The stability of aqueous solutions is a function of their pH; 0.5% solutions in U. S. P. buffer solutions at pH 7.0, 8.0, 9.0 showed no perceptible decomposition on several months' standing at room temperature in flint glass vials. Solutions in aqueous propylene glycol have also shown excellent stability.

What I claim is:

1. The process of making a water-soluble sulfate of the estrane series which comprises mixing, in a pre-cooled inert chlorinated hydrocarbon medium under anhydrous conditions and in the presence of a free tertiary amine, a hormone of the estrane series and an excess of a tertiary amine-sulfur trioxide adduct free from occluded moisture and acids, boiling the mixture until formation of the solid reaction product is complete, filtering off the product, decomposing it in an alkaline medium, removing the liberated amine from said medium, then isolating the free estrane sulfate from the medium and purifying it.

2. The process of claim 1 in which carbon-tetrachloride is the solvent and pyridine is the free tertiary amine used.

3. The process of claim 1 in which estrone is the hormone used.

4. The process of claim 1 in which equilin is the hormone used.

5. The process of claim 1 in which equilenin is the hormone used.

RALPH SALKIN.

References Cited in the file of this patent

UNITED STATES PATENTS

| Number | Name | Date |
|---|---|---|
| 1,810,758 | Drescher et al. | June 16, 1931 |
| 1,835,841 | Beckett et al. | Dec. 8, 1931 |
| 1,921,497 | Barnes et al. | Aug. 8, 1933 |
| 2,035,361 | Bauer et al. | Mar. 26, 1936 |
| 2,267,258 | Ruzicka | Dec. 23, 1941 |
| 2,403,226 | Lecher et al. | July 2, 1946 |

FOREIGN PATENTS

| Number | Country | Date |
|---|---|---|
| 251,491 | Great Britain | May 23, 1941 |

OTHER REFERENCES

Schachter et al., Chem. Abs., vol. 33 (1939), page 1005.

Jensen et al., Chem. Abs., vol. 40 (1946), pages 2184-2185.

Butenandt et al., Zietschr fur Physio. Chem., vol. 259 (1939), pages 222-234.